United States Patent [19]
Anderson

[11] Patent Number: 4,502,762
[45] Date of Patent: Mar. 5, 1985

[54] DUAL WAVELENGTH OPTICAL SYSTEM

[75] Inventor: Keith D. Anderson, Ottawa, Canada

[73] Assignee: Northern Telecom Limited, Montreal, Canada

[21] Appl. No.: 440,871

[22] Filed: Nov. 12, 1982

[51] Int. Cl.³ .................................................. G02B 5/30
[52] U.S. Cl. ..................................... 350/394; 350/397; 369/44
[58] Field of Search ................. 350/394, 397, DIG. 1; 369/44

[56] References Cited

U.S. PATENT DOCUMENTS

| | | | |
|---|---|---|---|
| 3,463,575 | 8/1969 | Gates, Jr. | 350/394 |
| 4,290,122 | 9/1981 | Bates et al. | 369/45 |
| 4,332,476 | 6/1982 | Stenberg et al. | 350/394 |

OTHER PUBLICATIONS

Smolkin et al., "Light Splitting Device", Soviet Jr. of Optical Technology, vol. 41, 8-1974, pp. 441-444.

*Primary Examiner*—William H. Punter
*Attorney, Agent, or Firm*—Stuart L. Wilkinson

[57] ABSTRACT

In dual wavelength equipment such as a combined read/write unit for an optical disc system, read light of wavelength $\lambda_1$ is directed through an isolator and a combiner, is reflected from a target back through the combiner and, at the isolator is directed out of the incident beam path to photodetectors. Write light of wavelength $\lambda_2$ is directed from a position off the read beam path to the combiner where it is re-directed into the read beam path and onto the target. The isolator has a linear polarizer, a polarizing beam splitter, and a retarder functioning together to ensure that at the polarizing beam splitter reflected light is linearly polarized in a direction perpendicular to the incident light. The combiner is typically an interference filter inclined both to the read and write beam path, which transmits $\lambda_1$ and reflects $\lambda_2$. Since the filter strongly alters the polarization state of obliquely incident light, a second interference filter located between the polarizing beam splitter and the first filter is used to compensate for the change in polarization state caused by the first filter and by other elements of the optical system.

11 Claims, 1 Drawing Figure

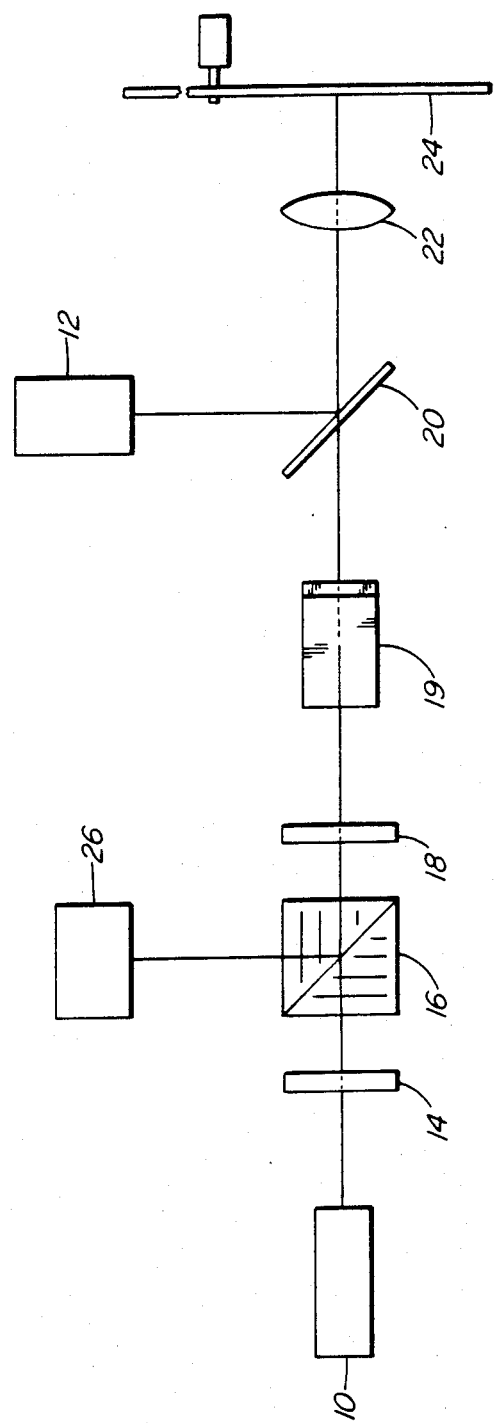

DUAL WAVELENGTH OPTICAL SYSTEM

This invention relates to an optical system in which two light beams of different wavelengths are manipulated such that over part of the optical system they share a common beam path. The invention finds particular application in a read/write head for optical disc equipment but can also be used in laser equipment for welding, annealing and integrated circuit mask fabrication.

In the specification, "light" means any part of the visible and near-visible radiation spectrum which can be used in the optical system described.

A read/write optical system for optical or video disc equipment typically has a high power laser diode for generating write light and a relatively lower power gas laser for generating read light, the read and write light having different wavelengths. The optical system transmits read and write light from the two lasers to the optical disc and transmits reflected read light from the optical disc to a photodetector. It is practically convenient to have some elements of the optical system common to the read, write and reflected beam paths.

Typically, the incident read beam is directed through an isolator and a combiner to the optical disc. At the combiner the read beam and the write beam are combined. Read light reflected from the optical disc passes back to the combiner and at the isolator is directed out of the incident beam path. The isolator prevents reflected light from propagating back to the read laser which would cause undesirable output fluctuation.

One form of isolator has a linear polarizer, a beam splitting polarizer and a retarder. In operation, incident read light is linearly polarized at the linear polarizer and, owing to its direction of polarization, is transmitted freely by the appropriately oriented beam splitting polarizer. The linearly polarized light is converted into circularly polarized light at the retarder. The circularly polarized light is focused at, and reflected from, the optical disc back through the retarder. Ideally, the retarder converts it to light which is linearly polarized perpendicularly to the incident beam so that all of the reflected light is directed by the polarizing beam splitter out of the incident beam path. The reflected light is monitored at suitably placed photodetectors.

The combiner is typically an interference filter, a dichroic plate composed of multiple layers of material of different refractive index, the plate acting to transmit light at the read wavelength but reflect light at the write wavelength. The plate is positioned at 45° to the read light beam, the write light beam, and the reflected beam from the disc.

It has been found that interference filters of the dichroic type can strongly alter the polarization state of obliquely incident light. Consequently, the reflected light passed by the filter is no longer circularly polarized and at the retarder, is not converted into linearly polarized light. As a result, at the polarizing beam splitter some of the reflected light passes to the read laser instead of to the photodetectors.

To compensate for the interference filter affecting the polarization state of the obliquely incident read light, there is proposed by the invention a second interference filter similar to the first interference filter and placed between it and the retarder with an orientation relative to the first interference filter which ensures that the reflective light at the polarized beam splitter is converted to light which is linearly polarized substantially perpendicularly to the incident light.

Theoretically the best angle at which the second filter can be fixed is the same as that of the first filter but twisted around the read beam axis by 90°. However, practical optical systems usually have corner mirrors or prisms which cause minor alterations in the polarization state of light. Furthermore, to ensure that stray surface reflections do not stay on the optical system axis where they might affect detector readings or re-enter the source laser cavities, elements such as prisms and the retarder are generally mounted at slight skew angles so these elements too can adversely affect the polarization state of the reflected beam. The second filter can therefore be adjusted slightly from the theoretically ideal inclination to compensate for these minor disturbances and to optimize the separation of incident from reflected light at the isolator. Compensation is achieved without the time-consuming and delicate problem of re-aligning other optical system elements.

An embodiment of the invention will now be described by way of example with reference to the accompanying drawing showing the lay-out of an optical system according to the invention.

Referring in detail to the FIGURE there are shown elements of an optical disc or video equipment including a helium-neon gas laser 10, emitting at a wavelength of 630 nm, a gallium arsenide injection laser 12 emitting at a wavelength of 830 nm and an optical or video disc 24. In operation write light passes from laser 12 and is reflected from an interference filter 20 to the spinning disc 24 where it produces a record at the disc surface. Read light passes directly from the laser 10 to the spinning disc 24 and, following modulation according to the recording on the disc surface, is reflected back to a polarizing beam splitter 16 which directs it to photodetectors 26. The optical signal received is monitored in order to determine the nature of the recording on the disc.

As is known in the optical disc art, the disc 24 is adapted to receive and store a recorded signal in a track or tracks of spiral or concentric form. To record a signal on the disc, the high power laser is made to alter the reflectivity of the disc along the length of a track and according to the signal content. Consequently if a beam of read light is focused on the track as the disc is rotated then light reflected from the disc varies according to that signal. In one known system the signal is recorded as a series of alternating pits and lands along the disc track. An optical signal detector and signal analyser are, for example, set to analyse an overlap of the zero and first order light diffracted at the boundary zone between adjacent pits and lands. In an alternative detection system the surfaces of the pits and lands are a predetermined distance apart. The relative phase difference of light reflected from a pit and its adjacent land produces an interference pattern, the variation in the pattern representing data, focus error and tracking error. The particular nature of the optical discs and the signal processing equipment required in order to analyse light received at the photodetector are peripheral to the present invention and are not described in detail here. Similarly video and optical disc equipment normally has a number of electro-optical drive and servo systems functioning to move the focused spot to ensure that it is constantly focused at the correct point on the disc surface in spite of any tendency for the focusing lens/disc separation to change as the disc rotates and despite eccentricity in disc rotation. Such drive and servo schemes are peripheral to the present invention, but since they are practically necessary in an optical or video disc system details of these systems can be found in the following review articles Philips Technical Review, Volume 33, No. 7, published in 1973, RCA Review, Volume 39, No. 3, published in 1978 and SPIE Proceedings, Volume 200, published in 1979.

Other elements of the optical system shown in the FIGURE are a linear polarizer 14, a quarter-wave plate 18, dichroic plates 19 and 20 and an objective lens 22. Read light from laser 10 is linearly polarized at the polarizing plate 14, the polarization direction permitting it to pass through the polarizing beam splitter 16 with minimum attenuation. At the quarter-wave plate 18 the plane polarized read light is converted to circularly polarized light which passes through the dichroic plates 19 and 20 before being focused at the optical disc surface. The dichroic plate 20 acts to combine the light paths from the gas laser 10 and the semiconductor laser 12. The dichroic plate through its thickness consists of alternating layers of glass of differing refractive indices. Typically for combining light from the helium-neon and gallium arsenide sources indicated, the dichroic mirror comprises a glass plate upon which many thin layers of three or four different materials are deposited. By selecting the thickness of the layers, and generally alternating materials of high refractive index (e.g. ZnS) and low refractive index (e.g. $Na_3AlF_6$), the stack can be made to be highly reflective through constructive interference at some values of incident angle and wavelength, while being transmissive at other wavelengths and incident angles. A typical example is commercially available from Melles Griot under product number 03MHG009. Although the dichroic plate or mirror 20 functions well to combine the read and write light or to allow transmission of read light only when the equipment is used in a read-only mode, it does have an adverse side effect: it tends to attenuate and retard one polarized component of circularly polarized light more than another. Considering the FIGURE again, the component of the circularly polarized light which extends vertically in the plane of the paper is subject to less attenuation than the component extending perpendicularly to the page. Both the incident and reflected beams of read light are subjected to this disparate attenuation together with a relative phase shift. If the dichroic plate 19 is not present, light returning to the polarizing beam splitter 16 is elliptically polarized instead of linearly polarized at 90° to the incident linear polarization as would be expected by two passes through the quarter-wave plate 18. Thus instead of light being totally reflected at the polarizing beam splitter towards the photodetectors 26 some of the reflected read light passes back to the helium-neon laser. There are two disadvantages. Firstly some of the reflected light is lost to the photodetector system so decreasing the system signal to noise ratio. Secondly the light which is lost to the detection system returns to the laser 10 and couples back into it so causing fluctuation of the laser output. Of course to ensure high fidelity, the output of the laser 10 should, in contrast, be of constant amplitude.

Other optical system elements commonly found in an optical disc system also have disparate effect on perpendicular components of the circularly polarized light. To compensate for this effect and ensure that reflected light reading the polarizing beam splitter 16 is polarized perpendicularly to the incident light, the second dichroic plate 19 is introduced into the optical system between the first plate 20 and the quarter-wave plate retarder 18. The second dichroic plate is similar to the first so that the plates similarly affect circularly polarized light passing through them. As previously mentioned dichroic plate 20 is oriented at 45° to both of the directions from which source light comes from lasers 10 and 12. In contrast the second dichroic plate 19 although at essentially 45° to the light incident from the helium-neon source 10 is twisted substantially 90° around the optical axis between the retarder and the dichroic plate. The effect of plate 19 is exactly complementary to that of the dichroic plate 20, and thus, in combination, the pair of plates does not alter the polarization state of transmitted light. Although in practice the combination of the two dichroic plates 19 and 20 causes some attenuation of the reflected light this is not such a serious problem as having some of the monitored light intended for the detection system actually returned to the helium-neon laser 10. The angle about the read beam axis to which the compensating dichroic plate 19 is twisted could be made either a little more or less than 90° in order to compensate for minor additional influence on polarization state of other elements within the optical system. The orientation of the correcting plate 19 is selected by monitoring the light directed to photodetectors 26 using a constant amplitude source 10 and uniform reflectivity disc 24.

The operation of the dichroic plate 20 is most succinctly described by Jones' notation. In a coordinate system having z as the main beam direction, x as the direction of light from the laser 12 and y as the direction perpendicular to the page, the combiner 20 has an operator matrix $$\begin{pmatrix} 1 & \epsilon \\ \epsilon & \alpha \end{pmatrix}$$

where $\epsilon$ and $\alpha$ are complex and $|\epsilon|$ is small, while $|\alpha|$ is close to 1. The corrector 19 has an operator $$\begin{pmatrix} \alpha & \epsilon \\ -\epsilon & 1 \end{pmatrix}$$

and the combination of the corrector and the combiner has an operator of $$\begin{pmatrix} \alpha - \epsilon^2 & 2\epsilon \\ 0 & \alpha + \epsilon^2 \end{pmatrix}$$

which is sufficiently close to $$\alpha \begin{pmatrix} 1 & 0 \\ 0 & 1 \end{pmatrix}$$

that there is no effect on the polarization of the beam.

The corrector plate 19 is an inexpensive way of optimizing the optical system. It is possible to design and fabricate special interference dichroic filters which do not alter the polarization state of the read light. However, non-standard optical components are very expensive compared with the provision of two standard interference filters such as components 19 and 20.

Although the compensating mechanism has been described only in the context of optical disc systems, it will be appreciated that this optical system can be used in any dual wavelength optical system in which two beams must be overlapped and in which a reflection of one beam must be prevented from returning to its source. Dual wavelength optical systems are commonly used where a continuous, visible, beam is used for aligning and monitoring the effects of a second beam which is either invisible, or pulsed, or of dangerously high power. Laser machining (welding, annealing, cutting, drilling) systems often incorporate an alignment beam, as do surgical lasers and semiconductor device manufacturing lasers, which must be combined with the main beam. The suppression of reflected light which would return to a laser cavity, or the efficient direction of reflected light onto monitoring detectors calls for an isolator/combiner system similar to the optical disc system described above, and the addition of a second dichroic mirror for polarization correction is therefore useful in a variety of applications.

What is claimed is:

1. An optical disc read-write system comprising a first laser source for producing read light at $\lambda_1$, and a second laser source for producing write light at $\lambda_2$ wherein an incident read beam path from the first source passes through a linear polarizer, to a polarizing beam splitter, through a retarder and through inclined first and second interference filters to an optical disc, a reflected read beam path passes from the disc through the inclined second and first interference filters and through the retarder to the polarizing beam splitter, and an incident write beam path from the second source is reflected from the inclined second interference filter to the disc, wherein the second interference filter is inclined to both of the incident read and write beam paths and transmits radiation at $\lambda_1$ and reflects radiation at $\lambda_2$ and wherein the first interference filter is inclined to the second interference filter at an angle which increases isolation of incident and reflected read light by the polarizing beam splitter.

2. A system as claimed in claim 1 in which read light in the incident read beam path is transmitted by the polarizing beam splitter and read light in the reflected read beam path is reflected by the polarizing beam splitter.

3. A system as claimed in claim 1, in which the second interference filter reflects write light at $\lambda_2$ and transmits read light at $\lambda_1$.

4. An optical system as claimed in claim 1 in which an objective lens is located between the second interference filter and the disc.

5. An optical system as claimed in claim 1 in which the retarder is a quarter-wave plate.

6. An optical system as claimed in claim 1 in which the first source is a helium-neon gas laser.

7. An optical system as claimed in claim 1 in which the second source is a gallium arsenide semiconductor diode.

8. An optical system as claimed in claim 1 in which the second interference filter is a plate inclined at substantially 45° to the incident read and write beam paths, and the incident beam paths are substantially perpendicular to one another.

9. An optical system as claimed in claim 8 in which the first interference filter is inclined at substantially 45° to the incident read beam path and is twisted substantially 90° about said path relative to the second interference filter.

10. An optical system as claimed in claim 1 in which each of the interference filters comprises a plate of dichroic material.

11. An optical system as claimed in claim 10 in which the plate of dichroic material comprises alternating layers of ZnS and $Na_3AlF_6$.

* * * * *